United States Patent [19]

Wenzel

[11] 4,387,575
[45] Jun. 14, 1983

[54] POWER STATION

[76] Inventor: Joachim O. M. Wenzel, Hauptmannsreute 46, 7 Stuttgart 1, Fed. Rep. of Germany

[21] Appl. No.: 164,203

[22] Filed: Jun. 30, 1980

Related U.S. Application Data

[62] Division of Ser. No. 822,982, Aug. 8, 1977, Pat. No. 4,220,009.

[30] Foreign Application Priority Data

| Jan. 21, 1977 [DE] | Fed. Rep. of Germany | 2702232 |
| Feb. 17, 1977 [DE] | Fed. Rep. of Germany | 2706702 |
| Mar. 2, 1977 [DE] | Fed. Rep. of Germany | 2709036 |
| Jun. 24, 1977 [DE] | Fed. Rep. of Germany | 2728418 |

[51] Int. Cl.³ ............................................. F01K 25/10
[52] U.S. Cl. ........................................ 60/648; 60/671
[58] Field of Search ..................... 60/648, 651, 671; 62/52, 53, 55, 88, 89, 402; 48/191; 290/52

[56] References Cited

U.S. PATENT DOCUMENTS 2,964,917 12/1960 Webster ........................... 62/53 X
3,154,928 11/1964 Harmens .......................... 62/87 X Primary Examiner—Allen M. Ostrager
Attorney, Agent, or Firm—William A. Drucker

[57] ABSTRACT

In a method and apparatus for maintaining substantially constant delivery of a fluid pressure medium at lowered pressure from a supply pipe to a utilizing device, the fluid pressure medium is fed through a branch pipe to the device via a prime mover, such as a turbine, which provides the desired pressure drop. If the pressure in the supply pipe falls below a predetermined level, the lowered output of the prime mover is sensed and a shut-off valve in the branch pipe is closed and a press-reducing valve is opened in a bypass pipe connecting the supply pipe to the utilizing device. A flowmeter in the bypass pipe serves to detect rate of flow therein and, upon exceeding of a predetermined rate of flow, to close the pressure-reducing valve and to open the shut-off valve.

9 Claims, 1 Drawing Figure

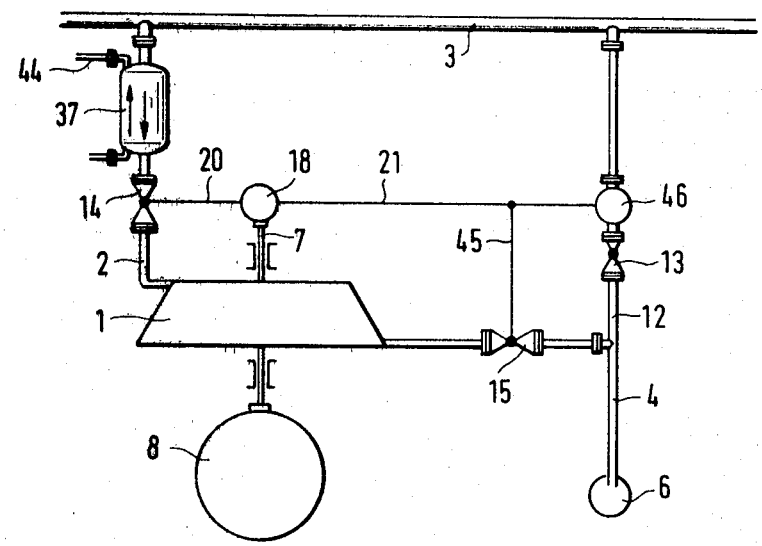

POWER STATION

This is a division of Ser. No. 822,982 file Aug. 8, 1977 now U.S. Pat. No. 4,220,009.

BACKGROUND OF THE INVENTION

The present invention relates to a power station with a turbine or expansion engine connected in combustion-free manner to a supply pipe of a pressure medium-conveying pipe system and whose delivery pipe is connected to the loads or consuming devices of the pressure medium.

A power station is already known in which a back pressure control by means of a bypass is provided in which is located a pressure reducing valve. Furthermore, a regulating valve is provided in the pipe leading to the turbine inlet in order to maintain the natural gas flow supplied to the turbine at a constant pressure. Therefore, the task has been to keep substantially constant the quantity current delivered by the generator, although natural gas consumption is known to fluctuate very considerably. To this end a turbine must be used, whose output corresponds to only the minimum load throughput of the natural gases. However, this means that the turbine must be very small, because in general the minimum throughput is very small. However, in all other cases, constant power output is not possible (U.S. Pat. No. 1,946,182). Furthermore, in the lower range it is not possible to reduce the pressure in the necessary manner.

The known back pressure regulating devices for alternating current generators, in which the speed is kept constant by a synchronous load network also only operate in a particular range of output fluctuations, whereby they deliver to the load network the greatly varying output. The possibility does not exist in the lower range to reduce the pressure in the necessary manner.

BRIEF SUMMARY OF THE INVENTION

It is the object of the invention to provide a power station of the above-indicated type in which a larger part of the throughput can be converted into usable energy than has hitherto been the case.

BRIEF DESCRIPTION OF THE DRAWINGS

Other and further objects of the present invention will be apparent from the following description and claims and are illustrated in the accompanying drawing which, by way of illustration, shows a preferred embodiment of the present invention and the principles thereof and what are now considered to be the best mode contemplated for applying these principles. Other embodiments of the invention embodying the same or equivalent principles may be used and structural changes may be made, if desired, by those skilled in the art without departing from the invention and the scope of the appended claims.

The single FIGURE of the drawings is a schematic circuit diagram of the preferred embodiment.

DETAILED DESCRIPTION OF THE PREFERRED EMBODIMENTS

At the top of the drawing, it is possible to see the main supply pipe 3, which is under a relatively high pressure. When shut-off valve 14 is opened, then via branch pipe 2 and through heat exchanger 37, the pressure medium is supplied to turbine 1, with the pressure of pipe 3, where it is relieved to the desired pressure and supplied by means of delivery pipe 4 to load 6. By means of shaft 7, the turbine drives generator 8, which generates power in the conventional manner. At the opposite end, shaft 7 is connected with a revolution counter or wattmeter 18, connected by an electrical line 20 with shut-off valve 14. A further electrical line 21 is provided between wattmeter 18 and a pressure reducing valve 13, located in bypass 12, connected with delivery pipe 4. A further shut-off valve 15 with an electrical line 45 is provided at the turbine outlet.

When valve 14 is open, the pressure medium heated by heat exchanger 37 flows through waste heat line 44 through turbine 1 and via open valve 15 and delivery pipe 4 to load or consuming device 6. The pressure in delivery pipe 4 is thereby regulated by the pressure reducing valve 13, so that a specific constant pressure is always present in pipe 4. If the inflow of pressure medium via the turbine is not sufficient to maintain the pressure in pipe 4, then pressure reducing valve 13 is automatically opened and additional pressure medium flows into pipe 4 until the pressure reaches the desired level.

Generator 8 can be an alternating current generator, in a synchronous load network, by which the speed of shaft 7 is kept constant. In this case, device 18 is a wattmeter which records the output delivered by generator 8. The switching off device stops the turbine if the output drops below a certain value due to a significant reduction of load 6, e.g. at night. To this end, valve 14 is closed via line 20, but valve 15 can also be closed by the further line 45, so that no pressure medium passes through bypass 12 into the turbine. In this case, load 6 is uninterruptedly supplied exclusively via pressure reducing valve 13 and pipe 12. Pressure reducing valve 13 also contains a flowmeter 46 or some other device which measures the flow through pipe 12 and converts it into electrical current. Such devices are known per se and need no detailed description. If the flow through pipe 12 exceeds a certain value, a switching on pulse is supplied by lines 20, 21 and 45 to valve 14 and optionally to valve 15, by which the turbine 1 is automatically started up again.

As a result of the automatic switching device according to the invention, it is achieved that load 6 is supplied with pressure medium without any interruption, no matter whether or not turbine 1 is in operation. The turbine can only be designed for large outputs, because in the case of smaller flow quantities, switching off automatically takes place.

If generator 8 is a direct current generator, then device 18 is constructed as a revolution counter and reacts to speed changes in the above-indicated manner. If there has been such a large reduction of consumption of load 6 that no further pressure medium flows through bypass 12, the speed of shaft 7 will necessarily decline if consumption further decreases. This will put into action the switching off device and the turbine is stopped. This is normally the case at night, when experience has shown that consumption greatly declines.

The pressure medium can be e.g. natural gas, but the through-put per time unit is also generally much lower at night than by day in the case of water or oil pipes. In the case of water or oil, a known type of expansion engine can take the place of turbine 1.

The additional bypass 16 with ramjet compressor 17 provides the advantage that turbine 1 can be differently designed namely in such a way that delivery pipe 4 can now convey a much lower pressure prior to entering ramjet compressor 17, because the pressure through the latter can be increased in the above-indicated manner. This naturally provides the possibility of causing a greater pressure drop through the turbine 1 than would otherwise be the case.

When turbine 1 is switched on again by flowmeter 46, bypass 12 is put out of service by valve 23 and valves 24, 14 and 15 are opened, to which end the electrical line 47 is provided between valve 24 and flowmeter 46.

It may also happen that there is a considerable drop in the pressure in pipe 3, e.g. in winter, which naturally causes a considerable reduction to the pressure in delivery pipe 4 from the turbine or expansion engine 1. The circuit of FIG. 2 has the advantage that the necessary pressure can easily be maintained in pipe 4, because the opening of regulating valve 19 makes possible a considerable pressure increase in pipe 4. Even if the pressure has dropped almost to zero at the outlet from turbine 1, the possibility exists to considerably increase the pressure by the known ramjet compressor 17 and in addition to expert can easily evaluate the latter.

In the embodiment according to FIG. 2, load 6 can take the place of intermediate accumulator 5 connected with load 6. This is obvious to the expert without it being shown in the drawings, load 6 taking the place of intermediate accumulator 5.

However, the provision of an intermediate accumulator 5 gives the important advantage of operating turbine 1 with a completely constant output and with a random peak current time, namely until intermediate accumulator 5 is full. The turbine, like the total inflow, is then switched off, usually automatically. Thus, not only valve 24 but also valve 23 is closed.

FIG. 3 shows a further embodiment with a similar switching on and off device to that described in FIG. 1. However, in this case, a plurality of turbines 10a, 10b and 10c are provided, being connected in parallel. At the top of FIG. 3, there is once again a main pipe 3 which conveys high pressure and from which, as in FIG. 1, branches pipe 2 which substantially conveys the same pressure. Pipe 2 has a flowmeter 43, connected via an electrical line 41 with a regulating device 40, from which a further electrical line 42 leads to a valve 15. By means of regulating device 40 in conjunction with flowmeter 43 and valve 15, a uniform extraction from main pipe 3 is achieved. By means of the regulating device it is possible to regulate the extraction of the quantities flowing through pipe 2. Such regulating devices are known and require no further description. As a result, the pressure differences in pipe 3 can be compensated.

Thus, without any pressure reduction, a specific quantity of gas can be continuously fed day and night into the high pressure intermediate accumulator 5a. The pressure in accumulator 5a is consequently only just under that in pipe 3, whereby it can be e.g. a high pressure above ground accumulator. By means of regulating device 40 it can also be achieved that an outflow of approximately the same quantity corresponds to said continuous inflow. Removal takes place via pipe 27 and turbine 10 to load 6. However, if consumption is very low, generally at night, valve 15 can be automatically opened by regulating device 40 and additional quantities can be fed into further intermediate accumulators 28. Intermediate accumulator 28 can be in the form of a long-term accumulator, e.g. a liquid gas accumulator. Such accumulators or reservoirs are known and therefore do not require a detailed description.

Before gas is supplied via pipe 27 to load 6, relief takes place via several turbines 10a-10c, connected parallel to one another through pipe 35. Pipes 9a-9c lead to the individual turbines 10a-10c via valves 25a-25c. Bypass 12, as shown in FIGS. 1 and 2, with a conventional pressure reducing valve 13 is arranged parallel to lines 9. Delivery pipes 11a-11c of the turbine lead to a load line 29, which with the further lines leads to the individual loads 6.

The turbines can be switched in a similar manner to that described in FIGS. 1 and 2. They are connected via lines 20, 21 and 22 with revolution counters or wattmeters 18a-18c. In the case of a particular power or speed drop of turbines 10a-10c, the latter are switched off in succession. This means that at a particular power or speed drop, initially only one of the turbines is switched off, e.g. turbine 10c. The two other turbines continue to operate and only when as a result of a corresponding speed drop on these two turbines is a further turbine shut down. The number of turbines or expansion engines is not limited. The larger the number the more accurately the available pressure gradient is utilized.

The quantities of pressure medium not required by the operating turbines 10 flow via pipe 12 and pressure reducing valve 13, as well as pipe 29 to load 6. This provides the possibility of pressure regulation in pipe 29 for load 6, which must convey a specific and very low constant pressure. The turbines are switched on again by control pulses from flowmeter 46.

Turbines 10a-10c can be arranged on a common shaft 7, for which purpose the expert must provide couplings for switching off, which also applies with regard to generators 26a-26c. In this case, separate heat exchangers 37a-37c are provided.

In the case that expansion engines are used in place of turbines, it is advantageous to divide up into a larger number of units, because these expansion engines can only be built up to a certain size, but are much less expensive than turbines.

If necessary, the content of the long-term intermediate accumulator 28 can be fed to turbines 10a-10c via valve 34 and pipe 35.

FIG. 4 shows a further embodiment without a bypass, because the latter is not necessary if an intermediate accumulator 5 is located in delivery pipe 4.

Once again, a pipe 2, which leads via heat exchangers 37 to turbine 1, branches off from main pipe 3. Pipe 3 can be e.g. a natural gas grid pipeline under high pressure. However, it is also possible that pipe 3 is a pipe branching off the grid gas pipeline and whose pressure is lower than the latter. The arrangement described hereinafter can also be duplicated.

The pressure medium is relieved to the desired pressure by turbine 1 and is passed by delivery pipe 4 into intermediate accumulator 5, which can e.g. have a variable volume with constant pressure. A plurality of extracting pipes 9a-9e lead from intermediate accumulator 5 to loads 6a-6e, with the interpositioning of a further pressure reducing turbine 10a-10e. Although pipes 9a-9e only carry the pressure produced by accumulator 5, it is generally necessary in the case of natural gas pipes to further reduce this pressure prior to use, as is known to the expert. Here again, it is possible to use small turbines or expansion engines 10a-10e instead of pressure reducing valves, whereby the output thereof can be correspondingly reduced.

Valves and similar switching or operating elements known to the expert are not shown in this case, e.g. a valve is fitted in pipe 2 which can only be opened at peak demand times for electrical power, so that turbine 1 with generator 8 function as a peak power station. For example, in practice no less than 100,000 Nm$^3$/h of natural gas with a pressure of e.g. 25 bar can be passed through, being reduced by turbine 1 to e.g. 10 bar in pipe 4. The constant pressure in intermediate accumulator 5 is then somewhat lower, e.g. 8 bar, whereby after passing through pipe 9 this pressure is reduced at least once more by the turbines or expansion engines 10a–10e. However, the same arrangement can be duplicated many times until the natural gas reaches load 6 with a pressure of less than 1 bar. The invention is not restricted to the represented embodiment, e.g. the turbines or expansion engines 10a–10e can be interconnected by a ring main, connected with the intermediate accumulator via only a single pipe in which there is only one turbine 10.

Furthermore, the turbines can be located in a known back pressure regulator system in order to maintain the pressure in delivery pipe 4 constant when there are variations to the pressure in the main pipe 3.

Due to the intermediate accumulator 5 in delivery pipe 4 the possibility exists that turbine 1 only supplies completely constant quantities of current at specific times. Furthermore, the current output supply can greatly exceed the maximum gas throughput determined by load or consuming device 6. Thus, the invention provides an integration action by which the total expansion capacity over a 24 hour period can be fed at constant capacity into the load network over only a few peak consumption hours. Thus, the possibility exists of defining when and with what intake throughput the intermediate accumulator 5 is to be filled.

According to a further not shown embodiment, the possibility also exists of providing further small intermediate accumulators in the delivery pipes 11a–11b, which naturally completely correspond to the large intermediate accumulator 5 in delivery pipe 4. Thus, the small turbine 10a–10e can be operated in the same way as large turbine 1.

In addition, the turbines or expansion engines 10a–10e can be interconnected by a pipe, connected with an intermediate accumulator 5 by only one pipeline in which a single turbine 10 can be installed. Naturally, this has the advantage of installing a much larger turbine, in place of numerous small turbines 10a–10e.

The invention is not restricted to the represented embodiment to the extent that necessarily electric current must be generated. In place of generator 8 for generating electric power e.g. a compressed air generator or compressor could be driven if for example compressed air was required.

If in the above-indicated manner, small turbines 10a–10e are combined into a single larger turbine, this also provides the possibility of arranging the latter as a further low pressure turbine 10 on the shaft of turbine 1. For this purpose, a further pipe will lead from accumulator 5 into low pressure turbine 10 parallel to pipe 4. The gas is then only supplied to loads 6 after expansion in low pressure turbine 10. To this end, a cutoff coupling must naturally be provided in shaft 7 because inter alia lead 6 must be supplied via turbine 10, without it being necessary to fill intermediate accumulator 5 via turbine 1.

FIG. 5 shows the arrangement of two accumulators 5a and 28 connected upstream of turbine 10 and a low pressure accumulator 32 connected downstream thereof. The arrangement with the two upstream connected accumulators 5a and 28 is the same as in FIG. 3. Due to the arrangement of intermediate accumulator 32 in delivery pipe 31, the automatic switching on and off device of FIGS. 1 to 3 is generally not necessary.

Furthermore, pipe 30 leading from high pressure accumulator 5a through the load can have a much larger cross-section than pipe 27 according to FIG. 1, which leads via heat exchanger 37 to the single turbine 10 with generator 26, whose waste gases are fed into low pressure accumulator 32. The latter must have a volume such that it is at least possible to compensate the daily fluctuations in gas consumption. Numerous pipes lead from low pressure accumulator 32 to loads 6.

However, the peak consumption time can be limited to a few hours if the high pressure intermediate accumulator 5a and the low pressure intermediate accumulator 32 are made somewhat larger. The inflow via pipe 2 and flowmeter 43 can be made continuous, as in FIG. 1. However, via valve 33 and/or valve 36, turbine 10 can only be switched on at genuine peak consumption times without pressure energy being lost and without making too high demands on main pipe 3 in said peak consumption times. In this case, the pressure energy is stored in intermediate accumulators 5a, 28. Thus, turbine 10 can be larger than would otherwise be the case, because in the few peak power hours every day accumulator 5a can largely be emptied. Turbine 10 is equipped with a conventional speed regulation system, not shown in detail here, for driving the conventional generator 26 with a constant output in known manner. The pressure gradient can also be somewhat larger, because delivery pipe 31 must only have a back pressure which is just above the relatively low pressure of accumulator 32.

The content of long-term intermediate accumulator 28 can be supplied via valve 36 and pipe 41 to turbine 10 and low pressure intermediate accumulator 52. If accumulator 28 is a liquefied gas accumulator, the possibility exists of bringing the pressure in pipe 41 to approximately the same level as that in pipe 30. As is known, this takes place by the liquefied gas pump providing the pressure desired in pipe 41. The evaporator then ensures that the gas has approximately the same pressure. As a result, it is once again possible to use turbine 10. Valve 33 can be kept closed.

According to a further not shown embodiment, the intermediate accumulator 5a can be omitted. Pipe 2 is then directly connected with pipe 30 and from the latter branches off pipe 39 with valve 15 and without intermediate accumulator 5a which leads to intermediate accumulator 28.

As a result, it is no longer possible to store pressure energy in intermediate accumulator 5a. However, the possibility now exists of levelling out the quantity of gas taken from the grid gas pipe 3, i.e. particularly at night additional quantities of gas can be removed via valve 15, so that a uniform removal takes place. However, it will not be possible to achieve the above-indicated ideal conditions in which the same quantities of gas are extracted from pipe 3 over the entire 24 hour period, because in practice, such large quantities are generally not required for accumulator 28. However, there can be a certain gradual adaptation, whereby the possibility also exists of feeding quantities from intermediate accumulator 28 to load 6 via valve 36 to cover the daytime peak load requirements relative to turbine 10.

In this connection, it is pointed out that a random regulating device carries out a continuous comparison between a desired value and an actual value, whereby an adaptation of the actual value to the desired value is continuously performed. In the present case, the actual value is indicated by flowmeter 43, whilst the adjustment, i.e. the adaptation takes place via control valve 15. Experience has shown that the desired value can also be selected as a function of time and fed into device 40. The expert is aware of the average past consumption and can therefore calculate future consumption. It is also possible to install a computer in regulating device 40 which permits an automatic adaptation of the desired value through calculating past consumption. Furthermore, the desired value setting means can be adjustable as a function of time, so that regulating device 40 only operates at night with a given desired value which is dependent on the time of year. Regulating devices and computers of this type are known to the expert and therefore require no detailed description.

In the case of said arrangement with oil or water pipes preferably proven rotary or piston engines are used in place of turbine 1,10.

In the case of natural gas pipes, all the known natural gas accumulators or reservoirs can be used, particularly the known spherical gas accumulator. Spherical pressure reservoirs are also conventionally used for oil and water. Furthermore, said low pressure accumulators 5, 32 can also be constructed as pressureless accumulators, i.e. they can be liquid reservoirs. In this case, the heat exchangers 37 may be superfluous.

Advantageously, the waste heat line 44 of a power station passes through the heat exchangers 37. This leads to a considerable increase in the output of the power station according to the invention and prevents unmixing of the natural gas. In particular, in the case of liquefied gas from the long-term intermediate accumulator 28 it is possible to use in advantageous manner the process of U.S. Pat. No. 3,068,659 (Marshall) for heating the gas.

The invention is not limited to the embodiments described and represented hereinbefore and various modifications can be made thereto without passing beyond the scope of the invention In FIG. 6 there is a cooler 50 in the pipe 4 and several further pipes 48, 49 parallel to each other having a larger diameter d, however, the diameter d can be the same as the one of pipe 4 if this is large enough. The length L also will be adapted to the dimension wanted in order to forme an accumulator having the capacity wanted. Pipe 48 is connected by a short pipe 51 with pipe 4, pipe 49 with pipe 48 by the short pipe 52. Pipes 48, 49 are, of course, closed at the front and the rear ends.

Pipe 4 is connected with the consuming device 6 over pressure reducing valve 13 by delivery pipe 11. There are further valves as in the pregoing embodiments in order to fill the accumulator formed by the pipes 4, 48, 49, and possible a larger number of similar pipes. These can be used to cool the gas if the gas has been heated to a great extend by heat exchanger 37. In this case the after-cooler 50 can be omitted.

If no waste heat is available a heat pumping device known per se can be used to heat the gas in exchanger 37 using a combustion engine for driving the compressor of this device the waste heat of which can be used also to heat the gas in exchanger 37. In this way primary energy can be saved in heating the gas.

If the length L and diameter d of pipe 4 is sufficient this can be used alone to form the accumulator according to the invention.

In order to make sure that pressure reducing valve 13 is not working if the pressure has dropped to a certain extend a by-pass-line 53 can be arranged in which an on-off-valve 54 is opend and closed automatically when the pressure passes a certain level. So the valve 54 will be closed as soon as the pressure in pipe 4 has gone up to for example 5 bar again. In filling the pipe 4 the pressure may go up further to 15 bar.

If the crossection of the pipe 4 is 1 m$^2$ and the length 30 km it contains 30.000 m$^3$ natural gas of 1 bar. Under 10 bar it contains 300.000 N m$^3$. This is quite sufficient in many cases for the supply all the night-time over without having to fill it again.

In the case of water-pipelines the intermediate accumulator can be formed by a reservoir which may be a lake for drinking water.

What is claimed is:

1. A method, of supplying a fluid pressure medium from a supply pipe through a delivery pipe to a utilising device, which comprises the steps of:
   (i) determining the output of a prime mover connected through shut-off valve means to said delivery pipe
   (ii) closing said shut-off valve means and opening a pressure-reducing valve means in a by-pass pipe connected between said main supply pipe and said delivery pipe, when said output falls below a predetermined rate
   (iii) determining the rate of flow of the fluid pressure medium in said by-pass pipe
   (iv) when the rate of flow of the fluid pressure medium in said by-pass pipe exceeds a predetermined rate, closing said pressure-reducing valve and opening said shut-off valve means.

2. Apparatus, for delivering a fluid pressure medium at a lowered pressure from a supply pipe, comprising:
   (a) a delivery pipe for connection to a utilising device intended to receive the fluid pressure medium at the lowered pressure,
   (b) a branch pipe connecting the supply pipe to the delivery pipe,
   (c) shut-off valve means in said branch pipe
   (d) a fluid-operable prime mover in said branch pipe
   (e) output determining means driven by the prime mover
   (f) a by-pass pipe connecting the supply pipe to the delivery pipe,
   (g) a closable pressure-reducing valve in said by-pass pipe,
   (h) a flowmeter in said by-pass pipe
   (i) means coupling said output-determining means to said shut-off valve means and to said pressure-reducing valve for closing said shut-off valve means and opening said pressure-reducing valve, when said output-determining means determines that the output of the prime-mover has dropped below a predetermined limit, and
   (j) means coupling said flowmeter to said shut-off valve means and to said pressure-reducing valve for closing said pressure-reducing valve and opening said shut-off valve means when said flowmeter determines that the flow in said by-pass pipe exceeds a predetermined flow.

3. Apparatus, as claimed in claim 2, further comprising heat-exchanger means in said branch pipe between said supply pipe and said prime mover.

4. Apparatus, as claimed in claim 2, further including an alternating current generator driven by said prime mover, and wherein said output-determining means is a watt-meter recording the output of said generator.

5. Apparatus, as claimed in claim 2, further including a direct-current generator driven by said prime mover, and wherein said output-determining means is a revolution counter.

6. Apparatus, as claimed in claim 2, wherein said prime mover is a turbine.

7. Apparatus, as claimed in claim 2, wherein said prime mover is an expansion engine.

8. Apparatus, as claimed in claim 2, wherein the means coupling said output-determining means and said flowmeter to said shut-off valve means and to said pressure-reducing valve are electrical conductors.

9. Apparatus, as claimed in claim 2, wherein said shut-off valve means comprises a first shut-off valve disposed between said supply pipe and said prime mover, and a second shut-off valve disposed between said prime mover and said delivery pipe.

* * * * *